G. NIEDERMAIR.
Lamp-Chimney.
No. 165,116.
Patented June 29, 1875.
Fig: 1.
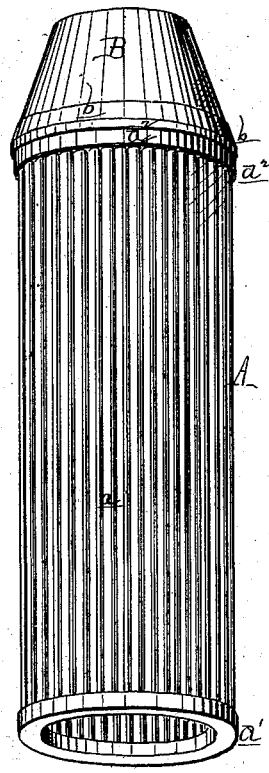
Fig: 2.
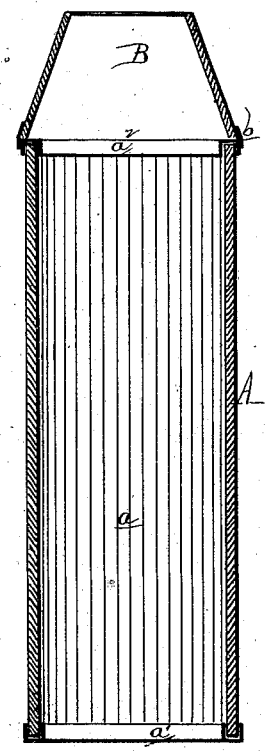
Fig: 3.
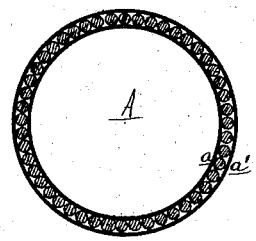
Attest.
Wm. P. Spalding
Charles Thurman
Inventor
Geo. Niedermair
By Atty
Phil. S. Sprague

UNITED STATES PATENT OFFICE.

GEORGE NIEDERMAIR, OF CHICAGO, ILLINOIS, ASSIGNOR OF ONE-HALF HIS RIGHT TO CHARLES KOPP, OF SAME PLACE.

IMPROVEMENT IN LAMP-CHIMNEYS.

Specification forming part of Letters Patent No. 165,116, dated June 29, 1875; application filed April 30, 1875.

*To all whom it may concern:*

Be it known that I, GEORGE NIEDERMAIR, of Chicago, in the county of Cook and State of Illinois, have invented an Improvement in Lamp-Chimneys, of which the following is a specification:

My invention consists in a cylindrical chimney, built of light rods of glass, held in place by a double flanged ring at top and bottom, and, when designed for use on lamps, each chimney is surmounted by a plain glass cone, which is held in place by a flange on the top ring.

Figure 1 is a perspective view. Fig. 2 is a vertical section. Fig. 3 is a cross-section.

In the drawing, A represents the body of the chimney, which is built up of rods $a$ of plain glass, either round, square, or any other form of section, whose lower ends are received in a channel-ring, $a^1$, at the bottom of the chimney, their upper ends being inserted in a similar ring, $a^2$, at the top. This completes the chimney for an argand gas-burner; but where it is to be used on a kerosene or other oil lamp it is surmounted by a plain glass cone, B, to increase the draft. This cone is held in place by a beveled hoop or flange ring, $b$, which is slipped over the base of the cone and the top-ring $a^2$. The chimney-rods are free to expand and contract independently of each other under changes of temperature, and, consequently, does away with the difficulty heretofore experienced by the cracking of solid chimneys from that cause, while the rods break up and refract the beams of light from the inclosed flame, making the light soft and pleasant to the eye.

I do not claim, broadly, the invention of separate glass rods, for such have been used before; but

What I claim as my invention is—

The combination of the chimney A, composed of separate glass rods $a$, secured in metallic channel-rings, with the glass cone B, substantially as described and shown.

GEORGE NIEDERMAIR.

Witnesses:
 WM. H. LOTZ,
 CHAS. KROESCHELL.